Figure 1:
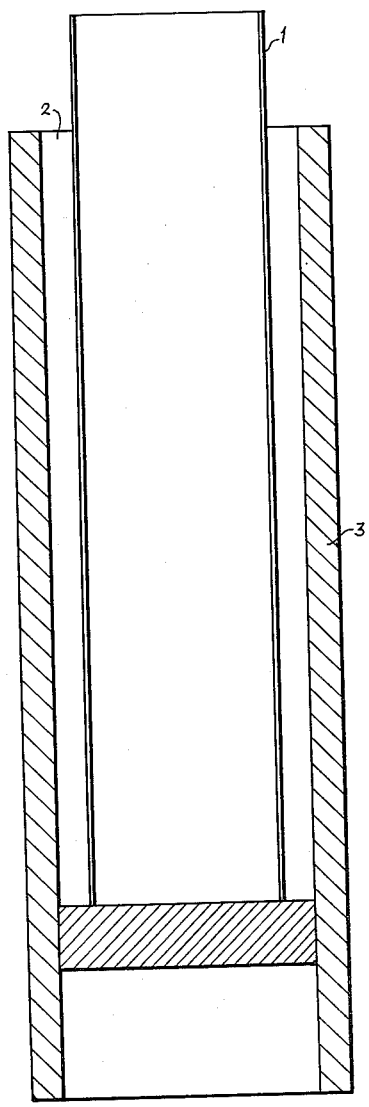

July 31, 1962  T. J. ROEMER  3,046,829
COMPOSITE PROPELLENT GRAINS
Filed June 22, 1959

INVENTOR.
THEODORE J. ROEMER
BY
ATTORNEYS

United States Patent Office 3,046,829
Patented July 31, 1962

3,046,829
COMPOSITE PROPELLENT GRAINS
Theodore J. Roemer, Herrin, Ill., assignor to Olin Mathieson Chemical Corporation, East Alton, Ill., a corporation of Virginia
Filed June 22, 1959, Ser. No. 821,921
1 Claim. (Cl. 86—1)

This invention relates to composite solid propellent grains and particularly to such grains having a lateral inhibitor sheath.

Large diameter propellent powder grains formed of inorganic particulate oxidizing agents together with modifying agents uniformly suspended in a binding matrix are generally referred to as composite solid propellant grains. They are used extensively as gas generating charges, rocket fuels, engine starters, and other applications relying for power generation upon the combustion products of a charge. Composite solid grains normally burn on all exposed surfaces. Thus, when all surfaces are free to burn, the rate of gas evolution decreases progressively as the surface area of the burning grain diminishes. In a number of commercial and military applications, when uniform thrust is desired throughout the entire combustion period, the composite grains must be provided with lateral inhibitors to insure that the grains will burn only from end to end.

Such inhibitors normally take the form of a plastic seal or sheet which is cemented to the lateral surface. Assemblies of this type have inherent weaknesses because of the lack of cohesion between the inhibitor and the grain surface and also because of the differences in coefficients of expansion of the different materials. Many of the prior art inhibited composite grains fail after being subjected to varying temperatures before being used because the seal between the inhibitor and the grain is ruptured by different rates of expansion and contraction, or for other physico-chemical reasons.

Another problem inherent to the use of solid propellants as sources of gaseous working fluid for auxiliary power systems, rather than for rocket propulsion, is the relatively high temperature of the gas generated. This difficulty is normally combatted by the use of cooling agents which can be in the form of a sheath about the grain or incorporated therein. When the inhibitor is sheathed about the grains, it presents the same problems that are encountered with laterally inhibited grains. On the other hand, the amount of cooling agent that can be incorporated into the grain is necessarily limited because compositions containing excessive proportions of coolant will not perform satisfactorily.

It is, therefore, an object of this invention to provide a laterally inhibited composite solid propellent grain overcoming the disadvantages of the prior art. It is also an object of this invention to provide a novel process for the manufacture of improved composite propellants. A more specific object of this invention is to provide a new and novel composite propellent grain having a lateral inhibitor containing a coolant and a method of making the same.

In accordance with this invention, generally speaking, these and other objects are accomplished by molding a charge of composite solid propellant, molding inhibitor about the composite charge but separate therefrom, and subsequently pressing the propellent charge and inhibitor into intimate contact to form a unitary laterally inhibited grain. The same binder is preferably used for the propellant and the inhibitor. However, two compatible binders can be used provided they are readily cohesive and do not have greatly divergent coefficients of expansion. After the grain is formed, it can be cured to complete the setting of the binder if necessary. More specifically, this invention contemplates tamping a composite propellent charge consisting of a predominant proportion of an inorganic oxidizer suspended in a plastic matrix into a mold separator which is substantially concentric but not in contact with the side walls of the mold. The annular space between the separator and the mold wall is then filled with a material which may be the same as that used as the matrix in the grain. After filling the mold, the separator is removed and the two charges in the mold are pressed into intimate contact. While the external inhibitor sheet can be formed entirely of the propellent grain matrix material, or another plastic material, it is preferable to incorporate therein an inert material which serves as a cooling agent upon combustion of the composite propellant.

The composite propellants of this invention are formed of a preponderant amount of solid particles of an inorganic oxidizing agent uniformly distributed throughout a matrix or binder. Various inorganic oxidizing agents can be used. Those meeting commercial acceptance include the nitrates, chlorates, and perchlorates of the alkali metals, alkaline earth metals, and ammonia. Of this group, ammonium nitrate and ammonium perchlorate are considered most important. Suitable binders include asphaltic materials, natural and synthetic rubbers, synthetic plastic materials, and the like. Synthetic rubbers based on the copolymers of polybutadiene with acrylic acid, methacrylic acid, vinylidine chloride, or the like, are particularly advantageous. Similarly, chemical rubbers of the polyurethane type may be employed. The proportions of the propellent binder and solid components can vary widely, but in most instances it is preferred to provide compositions in which the oxidizer is predominant.

Composite propellent charges also normally contain combustion modifiers which may constitute up to 10% or 15% of the weight of the grain. Suitable modifiers include guanidine nitrate, nitroguanidine, cyclotrimethylenetrinitramine, melamine, 2,4-dinitrophenoxyethanol, and the like. Relatively small amounts of carbon black and other opacifiers, as well as minor proportions of combustion catalysts, such as chromates and the like, can also be advantageously incorporated into the propellant to enhance its burning characteristics.

The inhibitor sheath of this invention may be formed of the same material as is used for the binder matrix in the composite grain, or of a dissimilar material. While the binder alone can be used as the inhibitor, particularly advantageous results are obtained when the inhibitor sheath consists of between about 70% to about 80% of a cooling salt or a heat-absorbing material and from about 20% to about 30% binder. These materials are preferably in a state of fine subdivision. The cooling salts undergo endothermic decomposition and liberate heat absorbing diluent gases. Suitable materials of this kind include ammonium oxalate, oxamide, melamine, urea, and the like. The heat absorbing inert materials function primarily by reason of their specific or heat capacity so as to hinder decomposition, collapse and combustion of the inhibitor matrix. Suitable materials of this kind include clay, various types of silicates, asbestos, and the like. The thickness of the inhibitor sheath can vary widely depending upon the operational specifications of the propellant but in all instances must be sufficiently thick to keep the lateral surfaces of the grain from burning. It has been found that the sheath must be at least 0.1 inch to insure such protection.

After the composite charge and inhibitor sheath have been blocked or pre-pressed in position, the separator between them is removed and while the grain and inhibitor are still in the mold, they are subjected to heat and pressure which consolidates the charge and brings the inhibitor into intimate contact with the lateral surface of the grain. Generally, the grain and inhibitor are consolidated under an axial pressure of about 5,000 p.s.i. and are subjected to a curing temperature in the neighborhood of 180° F. These values are not critical and pressures, curing times, and temperatures vary with the particular binder being used.

Figure 2:
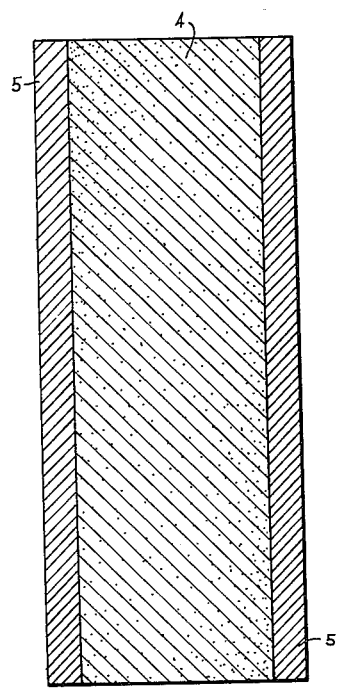

The manner in which these objects are accomplished will become clear when the following preferred embodiment is read in connection with the accompanying drawing in which:

FIGURE 1 is a longitudinal cross-sectional view of molding apparatus that can be utilized in accordance with this invention; and FIGURE 2 is a longitudinal cross-sectional view of a laterally inhibited grain made in accordance with the present invention.

About 1,000 parts by weight of a composite propellant charge consisting of an intimate mixture of about 75% ammonium nitrate, about 10% guanidine nitrate, and about 2% carbon black in a matrix of about 13% of acrylic acid-modified polybutadiene rubber were tamped into mold separator 1. Approximately 200 parts by weight of an inhibitor mix composed of about 20% acrylic acid-modified polybutadiene rubber and 80% ammonium oxalate were tamped into the annular space 2 between mold separator 1 and wall mold 3. After the mold was substantially filled, the separator was removed from its position between the composite charge and the inhibitor. These materials were then subjected to an axial pressure of about 5,000 p.s.i. for about 15 minutes in the mold. This pressure forced the inhibitor and the composite charge into intimate contact and consolidated the charge. The binder in the consolidated propellant charge was then cured by subjecting the grain to a temperature of about 180° F. for about 16 to 24 hours. The grain thus obtained is shown in FIGURE 2 and consists of a composite propellant charge 4 having an inseparable inhibitor coolant sheath 5.

Although, as shown in the drawing, the mold separator 1 is cylindrical, it is preferably provided with a slight draft to facilitate its removal from the mold. Also, any other type of molding apparatus can be readily utilized in carrying out the process of this invention. It is only necessary that the apparatus be provided with means for separating the inhibitor and the propellant and that these means can be readily removed prior to consolidation of the materials in the mold, preferably by axial compression.

In accordance with this invention, it is possible to fabricate inhibitors of any desired thickness and composition and propellant charges of any size or chape consistent with engineering practices used in compression molding. Although the above specific embodiment illustrates a solid cylindrical charge and its preparation, perforated charges can be readily made by the insertion of one or more appropriately shaped rods into the mold cavity prior to the introduction of the composite charge. Thus, various modifications which are encompassed by the present invention will be evident to those skilled in the art.

What is claimed is:

A process for the manufacture of inhibited composite solid propellant grains comprising tamping a composite propellant charge including an inorganic oxidizing agent and a binder into a cylindrical shape, tamping an inhibitor containing a cooling agent and a second binder as in the composite charge into an annular shape about the composite charge, separating means being positioned between the composite charge and inhibitor during tamping, removing the separating means, subjecting the composite charge and inhibitor to axial consolidating compression, and simultaneously curing the binders in the composite charge and in the inhibitor.

References Cited in the file of this patent
UNITED STATES PATENTS

| | | |
|---|---|---|
| 2,075,969 | White et al. | Apr. 6, 1937 |
| 2,479,828 | Geckler | Aug. 23, 1949 |
| 2,516,898 | Meister | Aug. 1, 1950 |
| 2,600,678 | O'Neill | June 17, 1952 |
| 2,628,561 | Sage et al. | Feb. 17, 1953 |
| 2,813,487 | Miller et al. | Nov. 19, 1957 |
| 2,858,289 | Bohn et al. | Oct. 28, 1958 |
| 2,897,714 | Precoul | Aug. 4, 1959 |